US009501999B2

(12) United States Patent
Min

(10) Patent No.: US 9,501,999 B2
(45) Date of Patent: Nov. 22, 2016

(54) CIRCUIT FOR GENERATING HORIZONTAL SYNCHRONIZING SIGNAL OF DISPLAY AND ASSOCIATED METHOD

(71) Applicant: Realtek Semiconductor Corp., HsinChu (TW)

(72) Inventor: Shawn Min, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 83 days.

(21) Appl. No.: 14/691,592

(22) Filed: Apr. 21, 2015

(65) Prior Publication Data

US 2015/0310825 A1    Oct. 29, 2015

(30) Foreign Application Priority Data

Apr. 29, 2014 (TW) .............................. 103115386 A

(51) Int. Cl.
| | |
|---|---|
| G09G 5/00 | (2006.01) |
| G09G 5/18 | (2006.01) |
| G09G 3/36 | (2006.01) |
| H04N 5/10 | (2006.01) |

(52) U.S. Cl.
CPC ............. *G09G 5/006* (2013.01); *G09G 3/3611* (2013.01); *G09G 5/18* (2013.01); *H04N 5/10* (2013.01)

(58) Field of Classification Search
CPC ...... G09G 5/006; G09G 5/18; G09G 3/3611; H04N 5/08; H04N 5/10
See application file for complete search history.

(56) References Cited

U.S. PATENT DOCUMENTS

| | | | | |
|---|---|---|---|---|
| 3,614,305 A | * | 10/1971 | Hidaka | ................. H04N 9/898 348/499 |
| 3,757,034 A | * | 9/1973 | Fujita | ...................... H04N 9/83 386/305 |
| 4,521,811 A | | 6/1985 | Stoughton | |
| 4,980,779 A | * | 12/1990 | Sakata | ................. H04N 9/7912 386/202 |
| 5,424,849 A | * | 6/1995 | Yamashita | ............. H04N 5/923 360/28 |
| 5,576,770 A | * | 11/1996 | Rumreich | ................ H04N 5/18 348/500 |
| 6,219,106 B1 | * | 4/2001 | Sato | ................... H04N 1/00291 348/523 |
| 2007/0296866 A1 | * | 12/2007 | Fujisawa | ................. H04N 5/14 348/571 |
| 2008/0007655 A1 | * | 1/2008 | Fujisawa | ................ G09G 5/005 348/571 |

FOREIGN PATENT DOCUMENTS

| | | |
|---|---|---|
| TW | 200631407 | 9/2006 |
| TW | 200633548 | 9/2006 |

* cited by examiner

*Primary Examiner* — Tom Sheng
(74) *Attorney, Agent, or Firm* — Winston Hsu; Scott Margo

(57) ABSTRACT

A circuit for generating a horizontal synchronizing signal of a display includes: a first comparator which is used to compare a luminance signal of a Component Video Connector of the display and a first reference signal to generate a compared signal; a control circuit which is used to generate a first digital controlled signal according to the compared signal; a first digital-to-analog converter which is used to generate the first reference signal according to the first digital controlled signal; a second digital-to-analog converter which is used to generate a second reference signal according to a second digital controlled signal generated by the control circuit, wherein the second digital controlled signal is determined by the first digital controlled signal; and a second comparator which is used to compare the luminance signal and the second reference signal to generate the horizontal synchronizing signal.

13 Claims, 5 Drawing Sheets

CIRCUIT FOR GENERATING HORIZONTAL SYNCHRONIZING SIGNAL OF DISPLAY AND ASSOCIATED METHOD

BACKGROUND OF THE INVENTION

1. Field of the Invention

The present invention relates to a display, and more particularly, to a circuit which is used to generate horizontal synchronizing signal of a display and associated method.

2. Description of the Prior Art

In a display, when received image is transferred by Component Video Connector (i.e. Y/Pb/Pr interface), the luminance signal(Y) needs to generate horizontal synchronizing signal additionally for the following use.

Refer to FIG. 1, which is a diagram illustrating the luminance signal Y and the wanted horizontal synchronizing signal Hsync. The luminance signal Y includes the horizontal synchronizing pulse, front porch, back porch, and the active video data of the Nth line on the screen. A display uses a comparator to determine whether the luminance signal Y is smaller than a reference voltage or not to decide if it is receiving the horizontal synchronizing pulse. Then according to the result, it generates the horizontal synchronizing signal Hsync.

However, refer to FIG. 2, which is a waveform diagram illustrating the horizontal synchronizing pulse of the luminance signal Y. Owing to the luminance signal is unstable in transmission, the maximum voltage Vmax and the minimum voltage Vmin of the horizontal synchronizing pulse are variable. Therefore, the reference voltage Vref which is utilized by comparator to generate the horizontal synchronizing signal Hsync has to vary with the varied maximum voltage Vmax and the varied minimum voltage Vmin of the horizontal synchronizing pulse. In prior art, it uses an analog-to-digital converter to transfer the luminance signal Y into a digital signal. Furthermore, after acquiring the maximum voltage Vmax and the minimum voltage Vmin of the horizontal synchronizing pulse, it decides the reference voltage Vref which is utilized by comparator. However, this conventional approach needs larger chip area and power consumption.

SUMMARY OF THE INVENTION

One of the objectives of the present invention is to provide a circuit for generating horizontal synchronizing signal of display and associated method which have less chip area and power consumption.

Based on an embodiment of the present invention, a circuit used to generate a horizontal synchronizing signal of a display comprises a first comparator, a control circuit, a first digital-to-analog converter, a second digital-to-analog converter and a second comparator, where the first comparator is utilized to compare the luminance signal of a Component Video Connector of the display and a first reference signal to generate a compared signal; the control circuit is coupled to the first comparator and based on the compared signal to generate a first digital controlled signal; the first digital-to-analog converter is coupled to the control circuit and the first comparator and based on the first digital controlled signal to generate the first reference signal to the first comparator; the second digital-to-analog converter is coupled to the control circuit and based on the second digital controlled signal which is generated by the control circuit to generate a second reference signal; and the second comparator is coupled to the second digital-to-analog converter and is used to compare the luminance signal and the second reference signal to generate the horizontal synchronizing signal. Based on the compared signal, the control circuit keeps updating the first digital controlled signal to make the first reference signal close to the luminance signal, and the control circuit generates the second control signal based on the first digital controlled signal when the first reference signal is close to the luminance signal.

Based on another embodiment of the present invention, a method used to generate a horizontal synchronizing signal comprises: Comparing a luminance signal of a Component Video Connector of the display and a first reference signal to generate a compared signal; generating a first digital controlled signal based on the compared signal; generating the first reference signal to the first comparator based on the first digital controlled signal; keeping updating the first digital controlled signal based on the compared signal to make the first reference signal close to the luminance signal, and generating a second digital controlled signal based on the first digital controlled signal when the first reference signal is close to the luminance signal; generating a second reference signal based on the second digital controlled signal, wherein the second digital controlled signal is decided by the first digital controlled signal; and comparing the luminance signal and the second reference signal to generate the horizontal synchronizing signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 3:
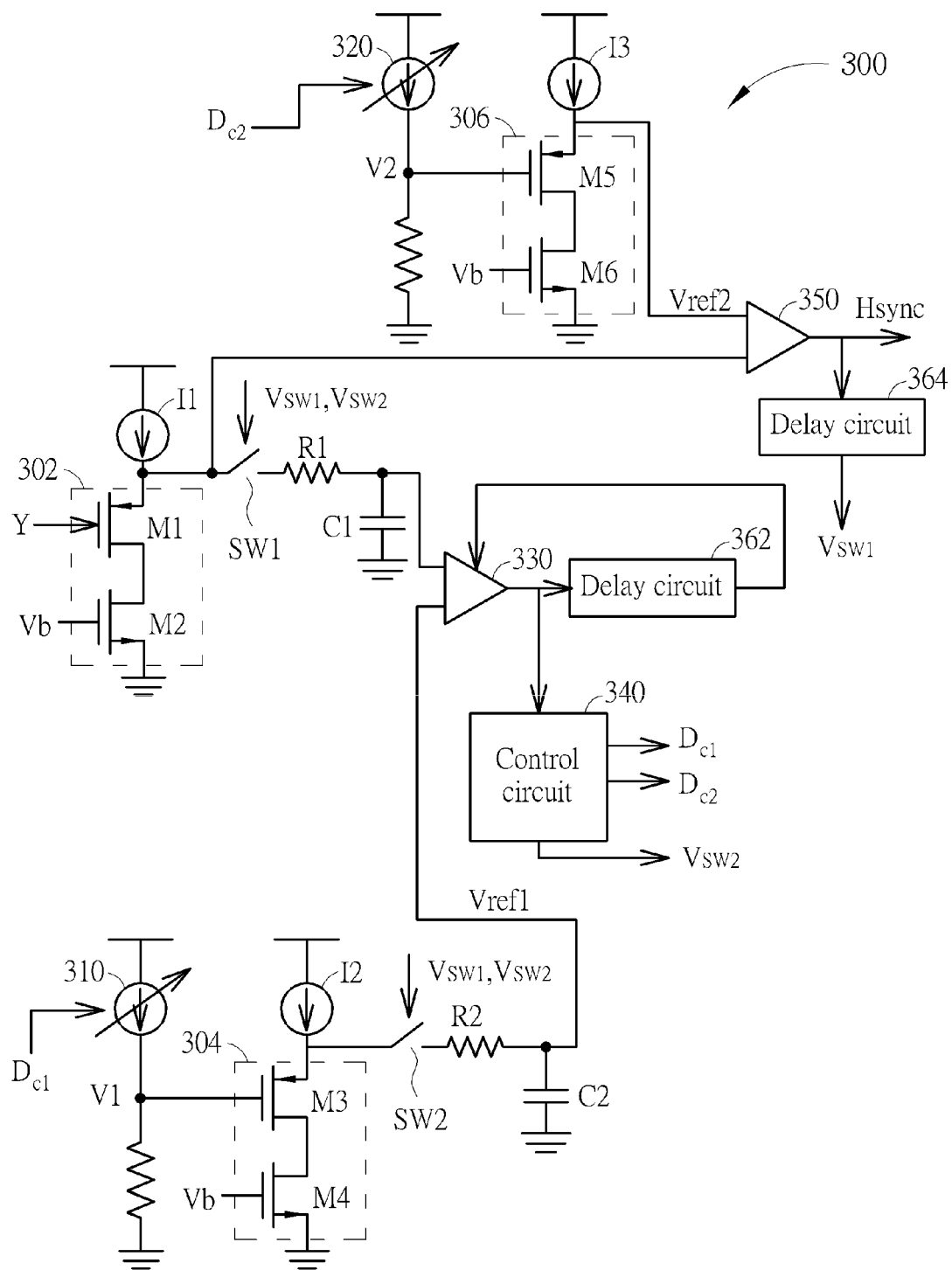
FIG. 3 is a diagram illustrating a circuit which is used to generate a horizontal synchronizing signal of a display according to an embodiment of the present invention.

Refer FIG. 3, which is a diagram illustrating a circuit 300 which is used to generate a horizontal synchronizing signal Hsync of a display according to an embodiment of the present invention. Circuit 300 comprises three buffers 302, 304, 306, two digital-to-analog converters (in this embodiment, implemented by two current digital-to-analog converters 310,320), two comparators 330,350, one control circuit 340, two delay circuits 362, 364, three current sources I1, I2, I3, two switches SW1, SW2, two resistors R, two filters which are respectively comprised by resistor R1, capacitor C1, resistor R2 and capacitor C2. Buffer 302 comprises two transistors M1 and M2, buffer 304 comprises two transistors M3 and M4, and buffer 306 comprises two transistors M5 and M6, where the gate terminals of transistor M2, M4, M6 are connected to a bias voltage Vb. In this embodiment, circuit 300 is installed in the display which is used to receive the luminance signal Y (analog signal) of a Component Video Connector of the display to generate the horizontal synchronizing signal Hsync.

In FIG. 3, the circuit structures of buffer 302,304, and 306 are for illustrative purposes only. In other embodiments of the present invention, buffer 302, 304, and 306 can be achieved by different circuit architecture. In addition, current digital-to-analog converters 310 and 320 can be the same architecture which can have the identical circuit layout. Therefore, with the same digital input, current digital-to-analog converters 310 and 320 can have the same analog outputs.

Figure 2:
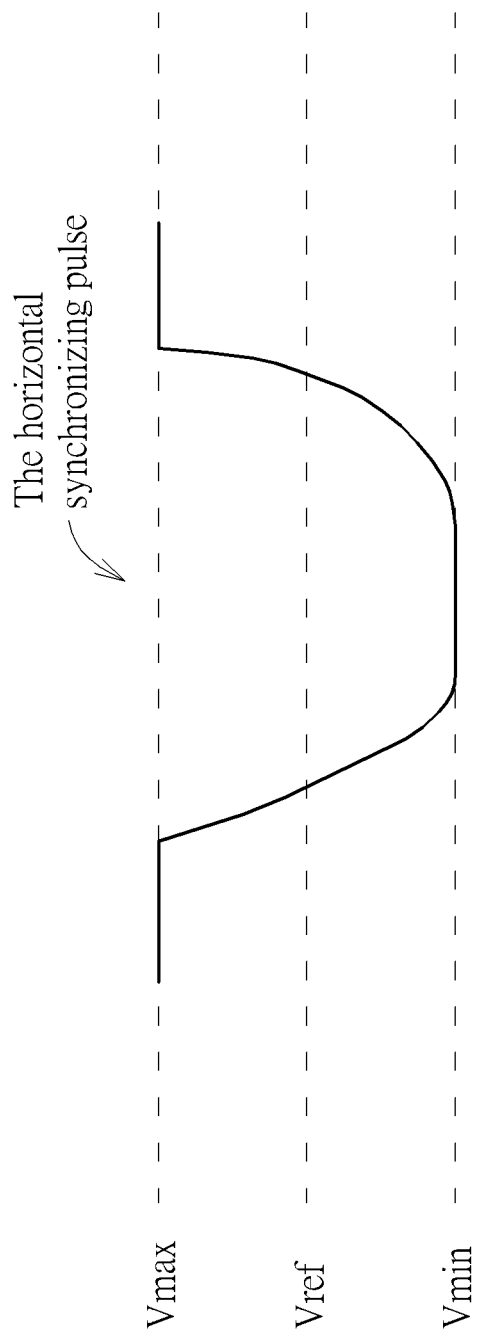
FIG. 2 is a waveform diagram illustrating the horizontal synchronizing pulse of the luminance signal.

In this embodiment, refer to FIG. 2, owing to the maximum voltage of the horizontal synchronizing pulse Vmax is about 0.4V and the minimum voltage Vmin is about 0.1V, current digital-to-analog converters 310 and 320 can use 6 digits for input and the voltage V1 in FIG. 3 which is generated by current is between 0 to 640 mV. However, this is only an example not a limitation for this invention.

In the operation of circuit 300, first, refer to FIG. 2 which is a waveform diagram illustrating the horizontal synchronizing pulse. Circuit 300 will decide the digital values corresponding to the maximum voltage Vmax and the minimum Voltage Vmin of the horizontal synchronizing pulse then take an average of the maximum voltage Vmax and the minimum voltage Vmin to generate a second reference voltage Vref2 (that is Vref2=(Vmax+Vmin)/2) to comparator 350 to generate the horizontal synchronizing signal Hsync, where the second reference voltage Vref2 shown in FIG. 3 corresponds to the Vref shown in FIG. 2.

To comprehensively explain the operation of circuit 300, first, in the period of the first horizontal synchronizing pulse in FIG. (this period can be determined by the internal circuit of the display), switch SW1 and SW2 will turn on (the operation of switch SW1 and SW2 will be discussed later) , control circuit 340 generates a first digit controlled signal Dc1 to current digital-to-analog converter 310 to make the voltage V1 be 0.1V. After buffer 304, the voltage V1 becomes the first reference voltage Vref1 and is transferred to the comparator 330 via switch SW2, resistor R2 and capacitor C2; In the meantime, after buffer 302, the luminance signal Y is transferred to the comparators 330 via switch SW1, resistor R1 and capacitor C1. Next, comparator 330 compares the buffered luminance signal Y and the first reference voltage Vref1 to acquire a compared signal. In this embodiment, when the compared signal indicates the buffered luminance signal Y is larger than the first reference voltage Vref1 (which means the luminance signal Y is larger than the voltage V1), control circuit 340 will update the first digital controlled signal Dc1 to increase the voltage V1 (which means increase the first reference voltage Vref1); Otherwise, when the compared signal indicates the buffered luminance signal Y is smaller than the first reference voltage Vref1, control circuit 340 will update the first digital controlled signal Dc1 to decrease the voltage V1 (which means decrease the first reference voltage Vref1). Control circuit 340 will keep updating the first digital controlled signal Dc1 according to the compared signal to make the first reference voltage Vref1 close to the buffered luminance signal Y (which means the voltage V1 is close to the luminance signal Y). If the output of comparator 330 keeps changing between 0 and 1 then turn off comparator 330 and record the first digital controlled signal Dc1. This recorded first digital controlled signal corresponds to the digital value of the minimum voltage Vmin of the horizontal synchronizing pulse shown in FIG. 2, where the first reference voltage Vref1 or the voltage V1 is close to the (buffered) luminance signal Y, that is the first reference voltage Vref1 or the voltage V1 actually equals to the (buffered) luminance signal Y.

Next, after the first horizontal synchronizing pulse, in the back porch in FIG. 1 (this period can be decided by the internal circuit of display), switch SW1 and SW2 will turn on (the operation of switch SW1 and SW2 will be discussed later), control circuit 340 generates the first digital controlled signal Dc1 to current digital-to-analog converter 310 to make the voltage V1 be 0.4V. After buffer 304, the voltage V1 becomes the first reference voltage Vref1 and is transferred to the comparator 330 via switch SW2, resistor R2 and capacitor C2; in the meantime, after buffer 302, the luminance signal Y is transferred to the comparator 330 via switch SW1, resistor R1 and capacitor C1 to comparator 330. Next, comparator 330 compares the buffered luminance signal Y and the first reference signal Vref1 to acquire a compared signal. In this embodiment, when the compared signal indicates the buffered luminance signal Y is larger than the first reference Vref1 (which means the luminance signal Y is larger than the voltage V1), control circuit 340 will update the first digital controlled signal Dc1 to increase the voltage V1 (which means increase the first reference voltage Vref1); otherwise, when the compared signal indicates the buffered luminance signal Y is smaller than the first reference voltage Vref1, control circuit 340 will update the first digital controlled signal Dc1 to decrease the voltage V1 (which means decrease the first reference voltage Vref1). Based on the compared signal, Control circuit 340 will keep updating the first digital controlled signal Dc1 to make the first reference voltage Vref1 close to buffered luminance signal Y (which means the voltage V1 is close to the luminance signal Y). If the output of comparator 330 keeps changing between 0 and 1 then turns off comparator 330 and records the first digital controlled signal Dc1. This recorded first digital controlled signal Dc1 corresponds to the digital value of the maximum voltage Vmax of the horizontal synchronizing pulse shown in FIG. 2, where the first reference voltage Vref1 or the voltage V1 is close to the (buffered) luminance signal Y, that is the first reference voltage Vref1 or the voltage V1 actually equals to the (buffered) luminance signal Y.

After acquiring two first digital controlled signals Dc1 respectively corresponding to the minimum voltage Vmin and the maximum voltage Vmax of the horizontal synchronizing pulse, control circuit 340 generates a second digital controlled signal Dc2 to current digital-to-analog converter 320, where the second digital controlled signal Dc2 is the average of two first digital controlled signals Dc1, that is after receiving the second digital controlled signal Dc2, the current generated by current digital-to-analog converter 320 will make the voltage V2 shown in FIG. 3 equal to an average of the minimum voltage Vmin and the Maximum voltage Vmax.(i.e. V2=(Vmax+Vmin)/2)

Figure 1:
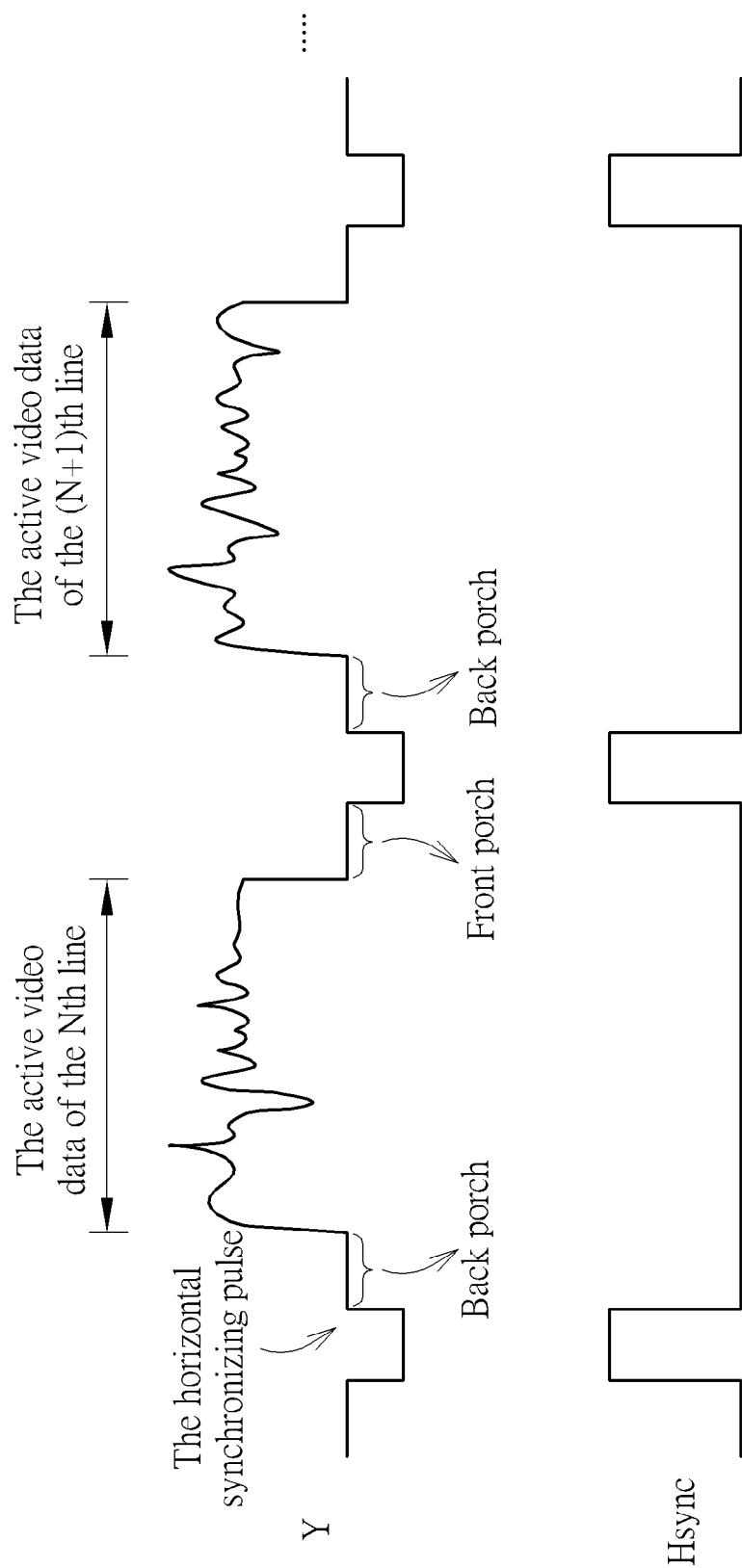
FIG. 1 is a diagram illustrating the luminance signal and the wanted horizontal synchronizing signal.

Next, during the period of the second horizontal synchronizing pulse shown in FIG. 1, the buffer 306 buffers the voltage V2 to generate the second reference voltage Vref2, and comparator 350 will compare the buffered luminance signal Y and the second reference voltage Vref2 to generate horizontal synchronizing signal Hsync.

The two first digital controlled signals Dc1 respectively corresponding to the minimum voltage Vmin and the maximum voltage Vmax of the horizontal synchronizing pulse and the second digital controlled signal Dc2 are still in processing, that is in the period of horizontal synchronizing pulse and in the back porch of the Nth line, the second digital controlled signal Dc2 generated by control circuit 340 is for comparator 350 to generate the horizontal synchronizing signal Hsync in the period of horizontal synchronizing pulse of the (N+1)th line; and in the period of horizontal synchronizing pulse and in the back porch of the (n+1)th line, the second digital controlled signal Dc2 generated by control circuit 340 is for comparator 350 to generate the corresponded horizontal synchronizing signal Hsync in the period of horizontal synchronizing pulse of the (N+2)th line, and so on.

In this embodiment, comparator 330 is an asynchronous comparator, that is comparator 330 does not have to receive the fixed clock signal to generate the compared signal. In addition, the design of the retardation of delay circuit 360 is based on the delay time of updating of the first reference voltage Vref1 (i.e. the delay produced by control circuit 340, current digital-to-analog converter 310, buffer 304, resistor R2 and capacitor C2) to control comparator 330 to start working after the first reference voltage Vref1 is updated.

Figure 4:
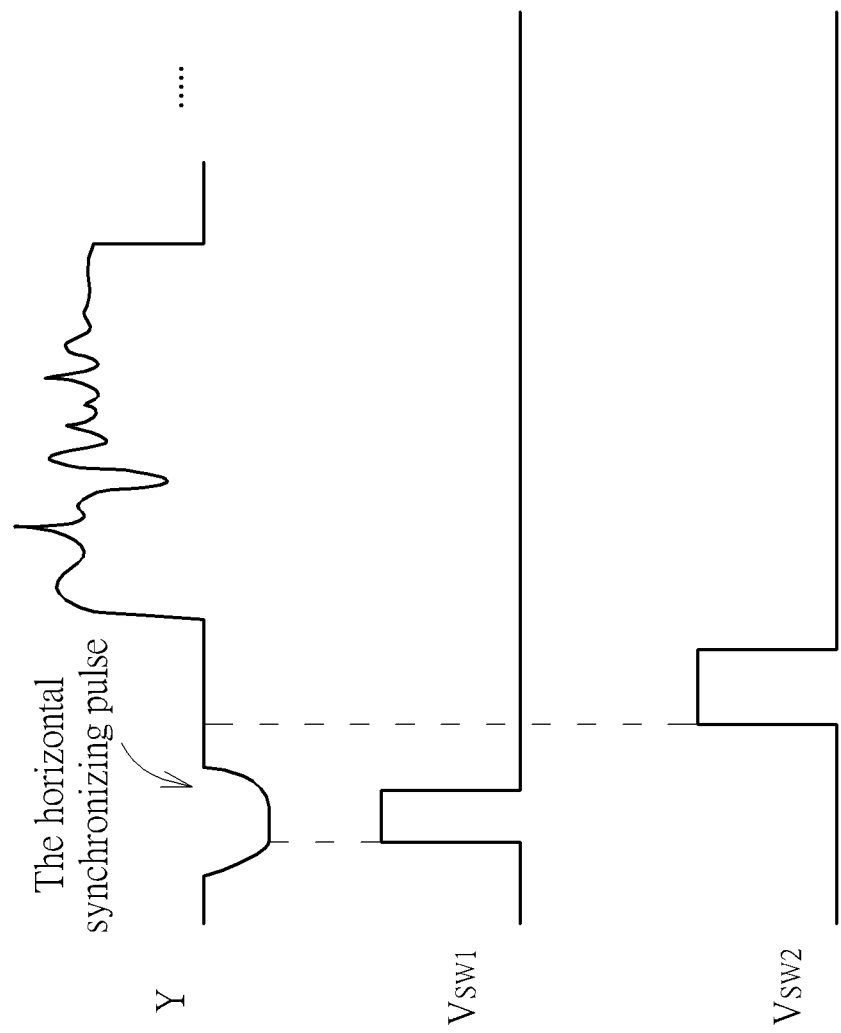
FIG. 4 is a diagram illustrating the relation between the switch signal and the luminance signal on timeline.

In addition, please refer to FIG. 4 and the delay circuit 364 and switch SW1 and SW2 shown in FIG. 3, where FIG. 4 is a diagram illustrating the relation between switch signal Vsw1, Vsw2 and the luminance signal Y on timeline. Referring to FIG. 3 and FIG. 4, switch signal Vsw1 is generated after delay circuit 364 postponing the horizontal synchronizing signal Hsync a specific time (that is the switch signal Vsw1 is a delayed horizontal synchronizing signal). The objective is that switches SW1 and Sw2 are switched on when it is in the bottom of the horizontal synchronizing pulse of the luminance signal Y to make comparator 330, control circuit 340 and current digital-to-analog converter 310 acquire the first digital controlled signal Dc1 which corresponds to the minimum voltage Vmin. Furthermore, switch signal Vsw2 is generated by control circuit 340, and the switch signal Vsw2 will switch on the switches SW1 and SW2 in the back porch of the luminance signal Y to make comparator 330, control circuit 340, and digital-to-analog converter 310 acquire the first digital controlled signal Dc1 which corresponds to the maximum voltage Vmax.

Figure 5:
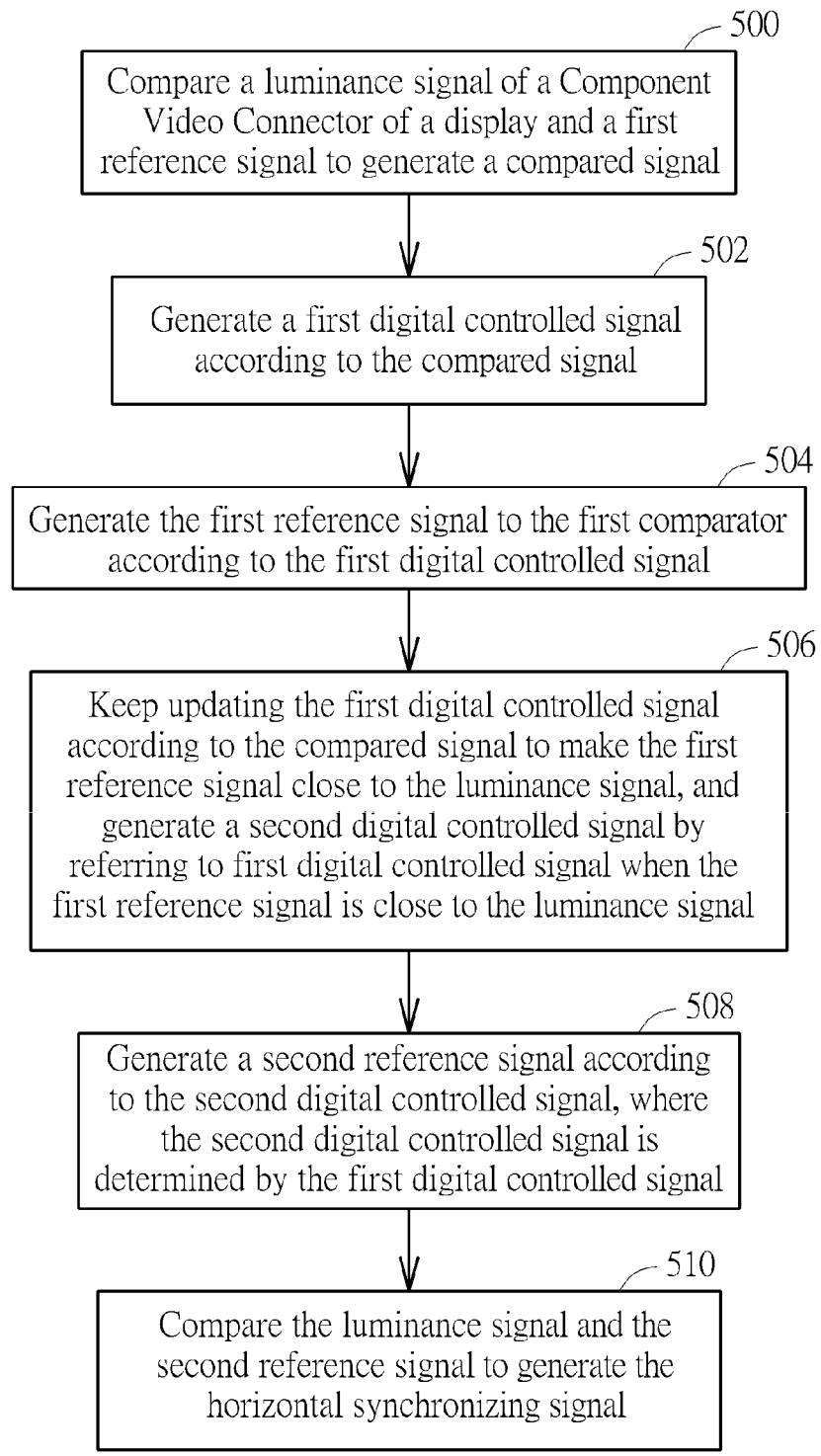
FIG. 5 is a flowchart illustrating a method which is used to generate a horizontal synchronizing signal of a display according to an embodiment of the present invention.

Refer to FIG. 5 which is a flowchart of a method for generating a horizontal synchronizing signal of a display according to one embodiment of the present invention. Referring to FIG. 1, FIG. 2 and FIG. 3 and associated disclosed content, the flow of FIG. 5 is described as follows:

Step 500: compare a luminance signal of a Component Video Connector of a display and a first reference signal to generate a compared signal;

Step 502: generate a first digital controlled signal according to the compared signal;

Step 504: generate the first reference signal to the first comparator according to the first digital controlled signal;

Step 506: keep updating the first digital controlled signal according to the compared signal to make the first reference signal close to the luminance signal, and generate a second digital controlled signal by referring to the first digital controlled signal when the first reference signal is close to the luminance signal;

Step 508: generate a second reference signal according to the second digital controlled signal, where the second digital controlled signal is determined by the first digital controlled signal;

Step 510: compare the luminance signal and the second reference signal to generate the horizontal synchronizing signal.

Briefly summarized, in the circuit for generating the horizontal synchronizing signal of a display and associated method of the present invention, the maximum voltage Vmax and the minimum voltage Vmin of the horizontal synchronizing pulse are obtained by using the digital-to-analog converters to generate the second reference voltage Vref2 to make comparator 350 generate horizontal synchronizing signal Hsync. Owing to the circuit in this invention utilizes digital-to-analog converter, so it has smaller chip area and relatively less power consumption and faster speed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit for generating a horizontal synchronizing signal of a display, comprising:
    a first comparator, arranged to compare a luminance signal of a Component Video Connector of the display and a first reference signal to generate a compared signal;
    a control circuit, coupled to the first comparator and arranged to generate the first digital controlled signal according to the compared signal;
    a first digital-to-analog converter, coupled to the control circuit and the first comparator, arranged to generate the first reference signal to the first comparator according to the first digital controlled signal;
    a second digital-to-analog converter, coupled to the control circuit, arranged to generate a second reference signal according to a second digital controlled signal generated by the control circuit; and
    a second comparator, coupled to the second digital-to-analog converter, arranged to compare the luminance signal and the second reference signal to generate the horizontal synchronizing signal;
    wherein the control circuit keeps updating the first digital controlled signal to make the first reference signal substantially equal to the luminance signal, and the control circuit generates the second digital controlled signal according to the first digital controlled signal when the first reference signal substantially equals to the luminance signal.

2. The circuit of claim 1, wherein at different time of the luminance signal, the control circuit determines two first digital controlled signals corresponding to a maximum voltage and a minimum voltage of a horizontal synchronizing pulse of the luminance signal respectively according to the compared signal; and the control determines the second digital controlled signal according to the two first digital controlled signals.

3. The circuit of claim 2, wherein in a period of a bottom of the horizontal synchronizing pulse of the luminance signal, the control circuit determines the first digital controlled signal corresponding to the minimum voltage of the horizontal synchronizing pulse according to the compared signal; and in a period of a back porch of the luminance signal, the control circuit determines the first digital controlled signal corresponding to the maximum voltage of the horizontal synchronizing pulse according to the compared signal.

4. The circuit of claim 3, wherein in the period of the bottom of the horizontal synchronizing pulse of the luminance signal, the control circuit keeps updating the first digital controlled signal until the compared signal indicates that the first reference signal substantially equals to the luminance signal, and at this time, the first digital controlled signal generated by the control circuit serves as the first digital controlled signal corresponding to the minimum voltage of the horizontal synchronizing pulse; and in the period of the back porch of the luminance signal, the control circuit keeps updating the first digital controlled signal until the compared signal indicates that the first reference signal substantially equals to the luminance signal, and at this time, the first digital controlled signal generated by the control circuit serves as the first digital controlled signal corresponding to the maximum voltage of the horizontal synchronizing pulse.

5. The circuit of claim 4, wherein in the period of the bottom of the horizontal synchronizing pulse of the luminance signal, the control circuit keeps updating the first digital controlled signal according to the compared signal until the compared signal generate by the first comparator keeps changing between logic 0 and 1, and at this time, the first comparator turns off and the first digital controlled signal generated by the control circuit is recorded to serve as the first digital controlled signal corresponding to the minimum voltage of the horizontal synchronizing pulse; and in the period of the back porch of the luminance signal, the control circuit keeps updating the first digital controlled signal according to the compared signal until the compared signal generate by the first comparator keeps changing between logic 0 and 1, and at this time, the first comparator turns off and the first digital controlled signal generated by the control circuit is recorded to serve as the first digital controlled signal corresponding to the maximum voltage of the horizontal synchronizing pulse.

6. The circuit of claim 1, additionally comprising:
a first switch, coupled to the first comparator, arranged to selectively make the first comparator receive the luminance signal or not according to switch signal;
a second switch, coupled to the first comparator and the first digital-to-analog converter, arranged to selectively make the first comparator receive the first reference signal or not according to the switch signal; and
a delay circuit, coupled to the second comparator, the first switch and the second switch, arranged to delay the horizontal synchronizing signal generated by the second comparator to generate the switch signal to the first switch and the second switch.

7. The circuit of claim 1, wherein the first comparator is an asynchronous comparator.

8. A method for generating a horizontal synchronizing signal of a display, comprising:
comparing a luminance signal of a Component Video Connector of the display and a first reference signal to generate a compared signal;
generating a first digital controlled signal according to the compared signal;
generating the first reference signal to the first comparator according to the first digital controlled signal;
keeping updating the first digital controlled signal to make the first reference signal close to the luminance signal according to the compared signal, and generating a second digital controlled signal according to the first digital controlled signal when the first reference signal is close to the luminance signal; generating a second reference signal according to the second digital controlled signal; and
comparing the luminance signal and the second reference signal to generate the horizontal synchronizing signal.

9. The method of claim 8, further comprising:
at the different time of the luminance signal, determining two first digital controlled signals corresponding to a maximum voltage and a minimum voltage of a horizontal synchronizing pulse of the luminance signal respectively according to the compared signal; and
determining the second digital controlled signal according to the two first digital controlled signals.

10. The method of claim 9, wherein the step of determining the two first digital controlled signals comprises:
in a period of a bottom of the horizontal synchronizing pulse of the luminance signal, determining the first digital controlled signal corresponding to the minimum voltage of the horizontal synchronizing pulse according to the compared signal; and
in a period of a back porch of the luminance signal, determining the first digital controlled signal corresponding to the maximum voltage of the horizontal synchronizing pulse according to the compared signal.

11. The method of claim 10, wherein the step of determining the first digital controlled signal corresponding to the minimum voltage of the horizontal synchronizing pulse comprises:
in the period of the bottom of the horizontal synchronizing pulse of the luminance signal, keeping updating the first digital controlled signal until the compared signal indicates that the first reference signal substantially equals to the luminance signal, and at this time, the first digital controlled signal used for generating the first reference signal serves as the first digital controlled signal corresponding to the minimum voltage of the horizontal synchronizing pulse; and
the step for determining the first digital controlled signal corresponding to the maximum voltage of the horizontal synchronizing pulse comprises:
in the period of the back porch of the luminance signal, keeping updating the first digital controlled signal until the compared signal indicates that the first reference signal substantially equals to the luminance signal, and at this time, the first digital controlled signal used for generate the first reference signal serves as the first digital controlled signal corresponding to the maximum voltage of the horizontal synchronizing pulse.

12. The method of claim 11, wherein the step of determining the first digital controlled signal corresponding to the minimum voltage of the horizontal synchronizing pulse comprises:
in the period of the bottom of the horizontal synchronizing pulse of the luminance signal, keeping updating the first digital controlled signal according to the compared signal until the compared signal keeps changing between logic 0 and 1, and at this time, recording the first digital controlled signal to serve as the first digital controlled signal corresponding to the minimum voltage of the horizontal synchronizing pulse; and the step of determining the first digital controlled signal corresponding to the maximum voltage of the horizontal synchronizing pulse comprises:

in the period of the back porch of the luminance signal, keeping updating the first digital controlled signal according to the compared signal until the compared signal keeps changing between logic 0 and 1, and at this time, recording the first digital controlled signal to serve as the first digital controlled signal corresponding to the maximum voltage of the horizontal synchronizing pulse.

13. The method of claim 8, wherein the step of comparing the luminance signal of the Component Video Connector of the display and the first reference signal is processed by a comparator, and the method further comprises:

providing a first switch to selectively make the comparator receive the luminance signal or not according to a switch signal;

providing a second switch to selectively make the comparator receive the first reference signal or not according to the switch signal; and delaying the horizontal synchronizing signal to generate the switch signal to the first switch and the second switch.

* * * * *